(12) United States Patent
Stevanov

(10) Patent No.: US 9,670,672 B2
(45) Date of Patent: Jun. 6, 2017

(54) ROOF PANEL SYSTEM

(71) Applicant: Aleksandar Stevanov, Windsor (CA)

(72) Inventor: Aleksandar Stevanov, Windsor (CA)

(*) Notice: Subject to any disclaimer, the term of this patent is extended or adjusted under 35 U.S.C. 154(b) by 0 days.

(21) Appl. No.: 14/958,850

(22) Filed: Dec. 3, 2015

(65) Prior Publication Data
US 2016/0194872 A1    Jul. 7, 2016

Related U.S. Application Data

(60) Provisional application No. 62/087,151, filed on Dec. 3, 2014.

(51) Int. Cl.
| | |
|---|---|
| *E04B 7/20* | (2006.01) |
| *E04D 15/04* | (2006.01) |
| *E04D 3/02* | (2006.01) |
| *H02S 20/23* | (2014.01) |
| *F24J 2/46* | (2006.01) |
| *F24J 2/52* | (2006.01) |
| *F24J 2/04* | (2006.01) |

(52) U.S. Cl.
CPC ............... *E04B 7/205* (2013.01); *E04D 3/02* (2013.01); *E04D 15/04* (2013.01); *F24J 2/4614* (2013.01); *F24J 2/5205* (2013.01); *F24J 2/5252* (2013.01); *H02S 20/23* (2014.12); *E04D 2015/042* (2013.01); *F24J 2/045* (2013.01); *Y02B 10/12* (2013.01)

(58) Field of Classification Search
CPC ........ F24J 2/5245; F24J 2/5211; F24J 2/5258; F24J 2/5207; F24J 2/4614; F24J 2/045; F24J 2/5205; F24J 2/5252; H02S 20/00; H02S 20/23; H02S 20/24; H02S 20/25; H02S 30/10; E04B 7/205; E04D 3/02; E04D 15/04; E04D 2015/042; Y02E 10/47; Y02B 10/12
USPC ...... 52/173.3, 655.1, 582.1; 248/219.4, 237; 403/205; 126/621; 136/243, 244
See application file for complete search history.

(56) References Cited

U.S. PATENT DOCUMENTS

| | | | | |
|---|---|---|---|---|
| 3,844,086 | A * | 10/1974 | Radtke ...................... | E04D 3/08 52/395 |
| 4,658,559 | A * | 4/1987 | Doherty ............... | A01G 9/1469 52/463 |
| 4,942,865 | A * | 7/1990 | Pierce-Bjorklund .... | F24J 2/045 126/633 |
| 5,226,274 | A * | 7/1993 | Sommerstein ...... | E04F 13/0805 52/509 |
| 2006/0032151 | A1 * | 2/2006 | Wyatt ................... | E04D 13/064 52/11 |
| 2007/0131273 | A1 * | 6/2007 | Kobayashi ............. | F24J 2/5211 136/251 |
| 2008/0169018 | A1 * | 7/2008 | Miyamoto ............. | F24J 2/5207 136/251 |
| 2008/0315061 | A1 * | 12/2008 | Fath ........................ | F24J 2/465 248/510 |
| 2010/0313506 | A1 * | 12/2010 | Schoell .................... | F24J 2/045 52/302.1 |

(Continued)

*Primary Examiner* — Theodore Adamos
(74) *Attorney, Agent, or Firm* — The Watson I.P. Group, PLC; Jovan N. Jovanovic; Vladan M. Vasiljevic

(57) ABSTRACT

A roof panel system including a plurality of roof panels, a plurality of side edge bracket systems and a plurality of end edge bracket systems. The plurality of roof panels are joined end to end and side to side by way of the side edge bracket systems and the end edge bracket systems.

9 Claims, 9 Drawing Sheets

(56) References Cited

U.S. PATENT DOCUMENTS

| | | | | |
|---|---|---|---|---|
| 2011/0047903 A1* | 3/2011 | Kobayashi | ............ | F24J 2/5211 52/173.3 |
| 2011/0174947 A1* | 7/2011 | Wu | ............ | F24J 2/5205 248/226.11 |
| 2011/0215213 A1* | 9/2011 | Poivet | ............ | F24J 2/4614 248/309.1 |
| 2012/0017526 A1* | 1/2012 | Eide | ............ | F24J 2/5207 52/173.3 |
| 2012/0117895 A1* | 5/2012 | Li | ............ | F24J 2/5205 52/173.3 |
| 2012/0180406 A1* | 7/2012 | Kobayashi | ............ | F24J 2/5207 52/173.3 |
| 2013/0055662 A1* | 3/2013 | Gilles-Gagnon | ............ | F24J 2/5205 52/173.3 |
| 2013/0104471 A1* | 5/2013 | Kobayashi | ............ | F24J 2/5245 52/173.3 |
| 2013/0340358 A1* | 12/2013 | Danning | ............ | B23P 11/00 52/126.7 |
| 2014/0311553 A1* | 10/2014 | Haddock | ............ | E04F 13/0817 136/251 |

* cited by examiner

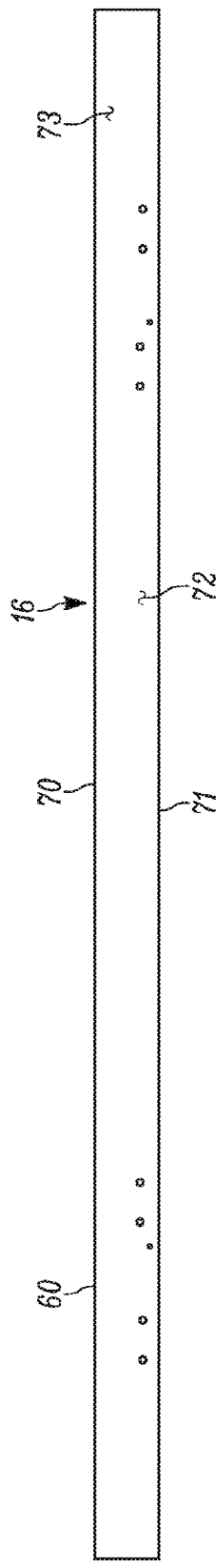
FIG. 7
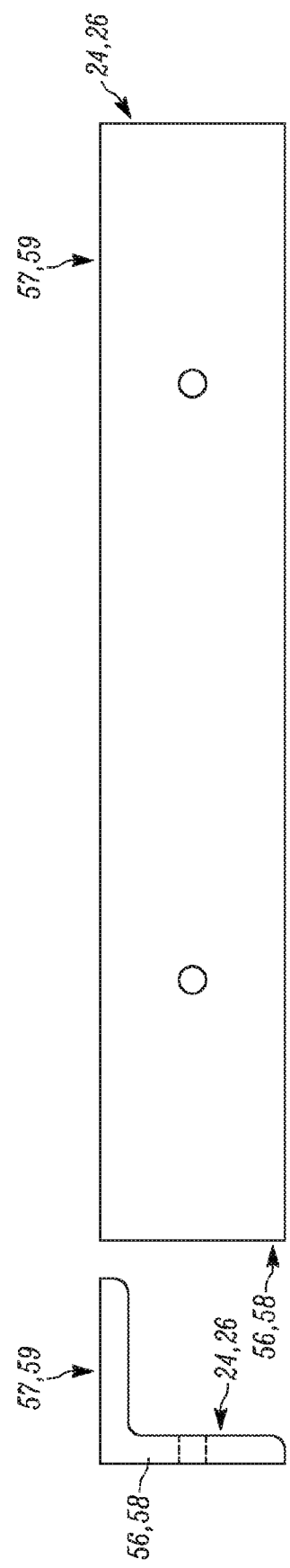
FIG. 8
FIG. 9

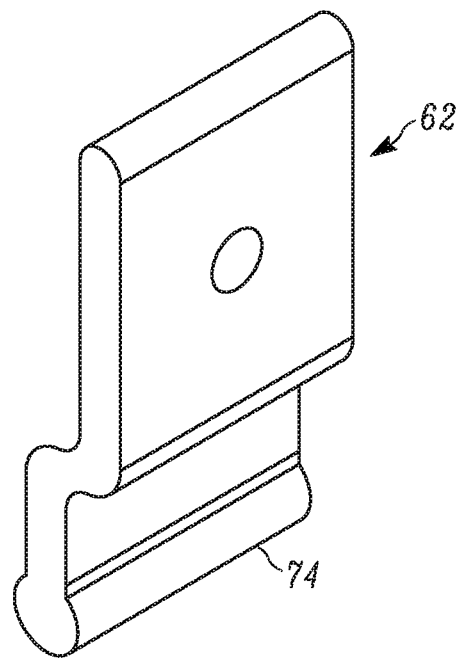
FIG. 14
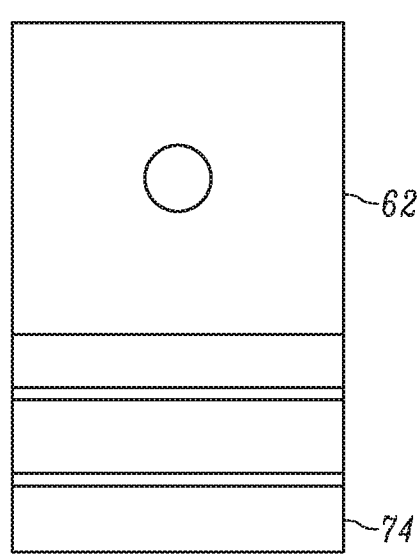 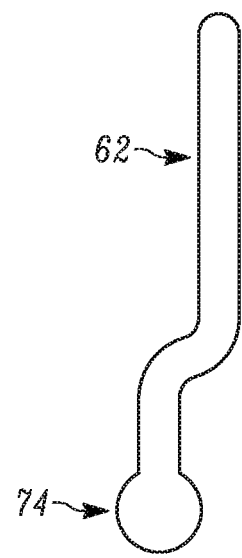
FIG. 15  FIG. 16

ROOF PANEL SYSTEM

CROSS-REFERENCE TO RELATED APPLICATION

This application claims priority from U.S. Prov. Pat. App. Ser. No. 62/087,151 entitled "Roof Panel System", filed Dec. 3, 2014, the entire specification of which is hereby incorporated by reference.

BACKGROUND OF THE DISCLOSURE

1. Field of the Disclosure

The disclosure relates in general to roofing systems for residential and commercial buildings and the like, and more particularly, to a roof panel system that includes a plurality of different components that are coupled together to form an integrally formed roof. It will be understood that such a roofing system may, but not must, include the use of solar panels and the like.

2. Background Art

The use of different roofing systems is known in the art. In many instances, wooden sheets are positioned over a plurality of rafters and coupled thereto. A protective material is then placed upon the wooden sheets, such as, for example, shingles, asphalt, metal sheeting and the like.

Problematically, such roofing systems are often difficult to install, repair and modify. That is, such systems, are installed at once. They are also not very versatile, as any additional features that are desired are generally positioned and utilized on top of the roofing systems.

Thus it is an object of the present disclosure to provide for improvements to conventional and prior art roofing systems.

SUMMARY OF THE DISCLOSURE

The disclosure is directed to a roof panel system including a plurality of roof panels, a plurality of side edge bracket systems and a plurality of end edge bracket systems. The plurality of roof panels are joined end to end and side to side by way of the side edge bracket systems and the end edge bracket systems.

More particularly, the side edge bracket system includes a central support bracket, which is preferably extruded, and a plurality of support clips. The support clips cooperate with the central support bracket to couple a roof panel to a rafter or the like. The end edge bracket systems likewise provide brackets and clips to further support the roof panels.

One of the features of the disclosure is the ability to direct rainwater that may seep through the roof panel system, that is between the brackets and the roof panels. Such water is directed into troughs or into gutters and then troughs, at which time it is collected and channeled away from the structure.

Another feature is the ability to utilize solar panels as some or all of the roof panels of the roof panel system.

BRIEF DESCRIPTION OF THE DRAWINGS

The disclosure will now be described with reference to the drawings wherein:

FIG. 7 of the drawings is a side elevational view of the reinforcing lateral bracket of the present disclosure;

FIG. 8 of the drawings is a side view of the first and second support clips of the present disclosure;

FIG. 9 of the drawings is a front elevational view of the first and second support clips of the bracket system of the present disclosure;

FIG. 14 of the drawings is a perspective view of the gutter of the present disclosure;

FIG. 15 of the drawings is a front elevational view of the gutter bracket of the present disclosure; and FIG. 16 of the drawings is a side elevational view of the gutter bracket of the present disclosure.

DETAILED DESCRIPTION OF THE DISCLOSURE

Figure 1:
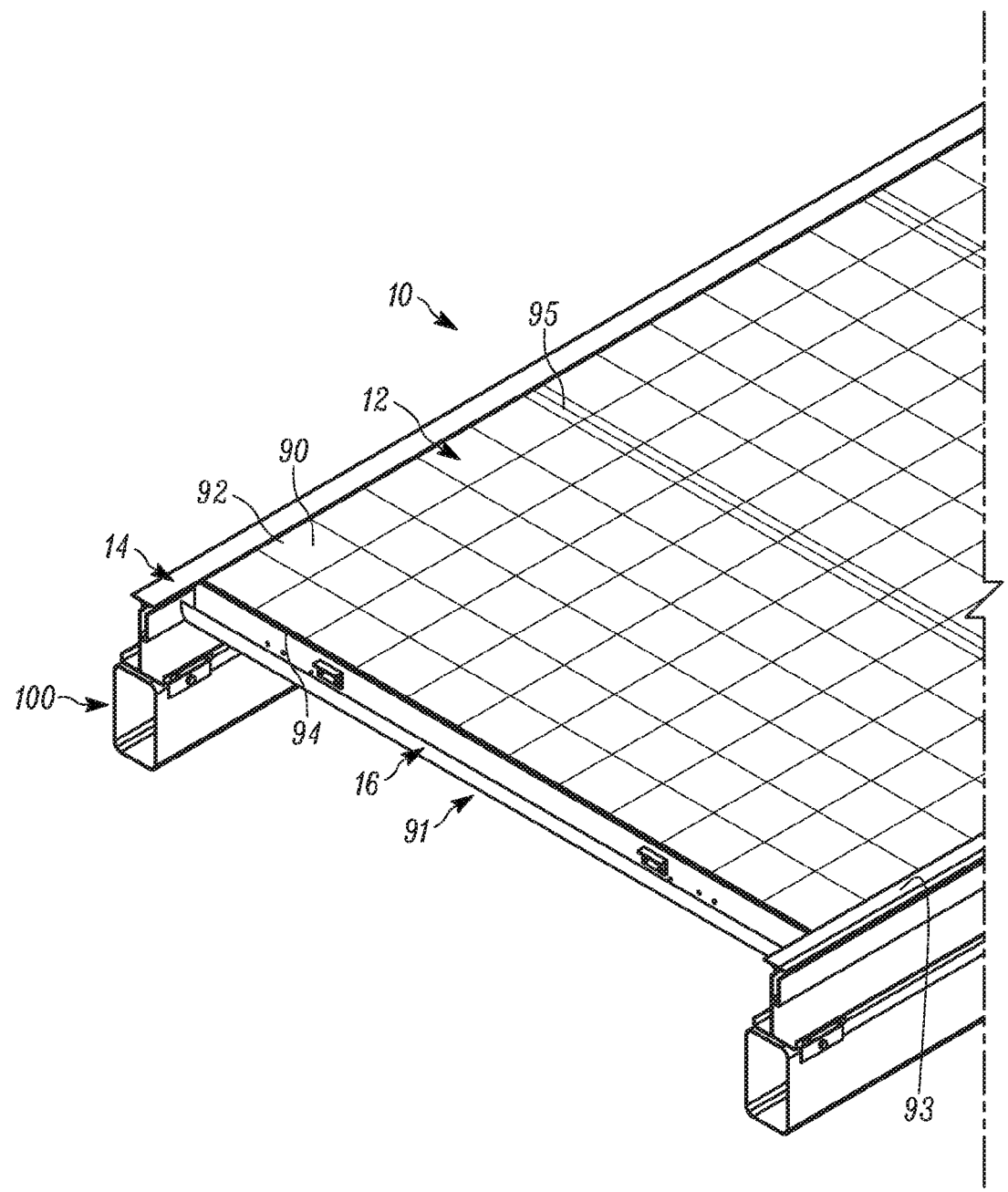
FIG. 1 of the drawings is a perspective view of the roof panel system of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
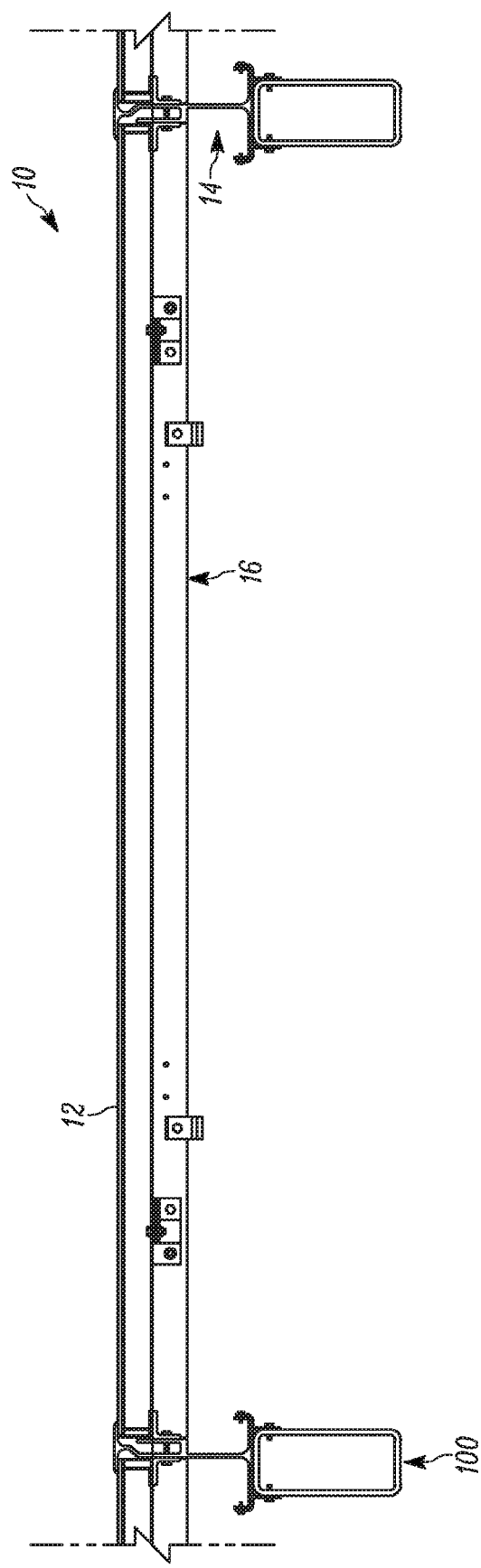
FIG. 2 of the drawings is a side elevational view of the roof panel system of the present disclosure.
Figure 3:
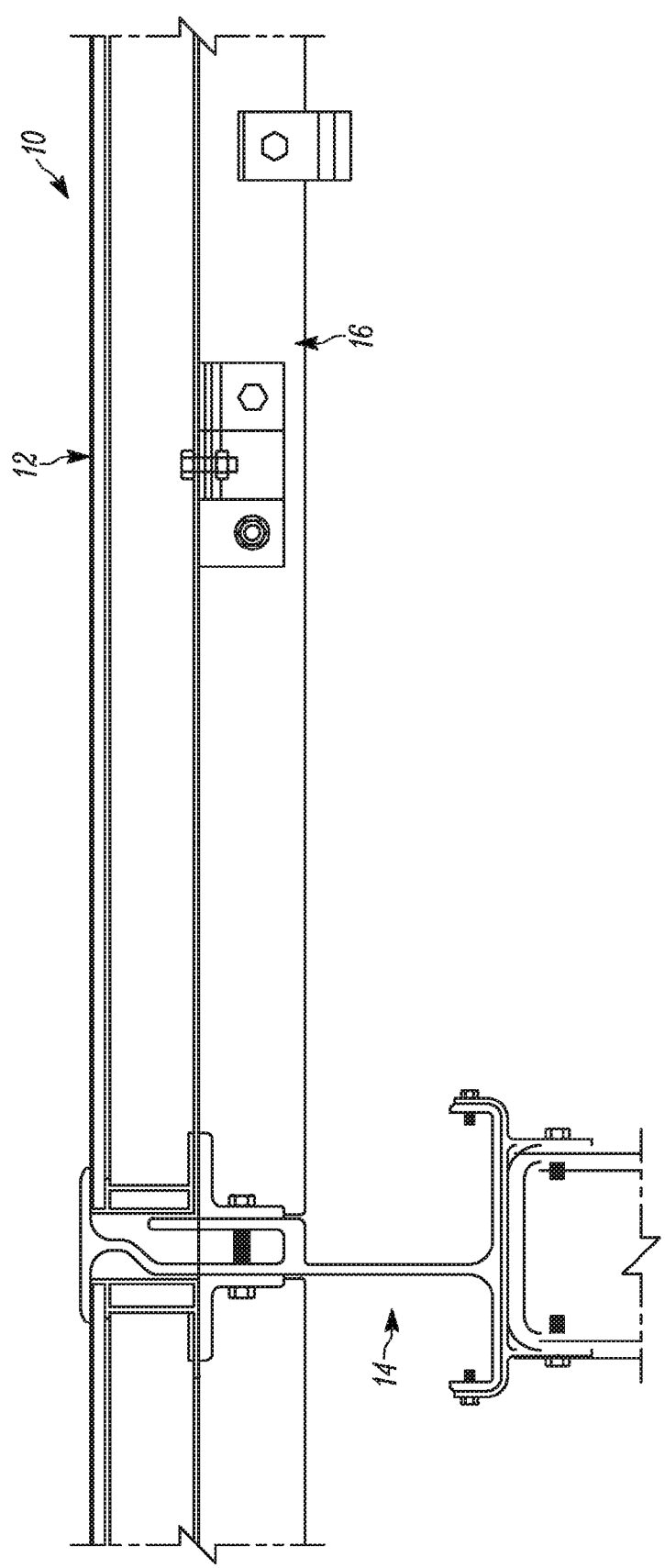
FIG. 3 of the drawings is a partial side elevational view of the roof panel system of the present disclosure.
Figure 4:
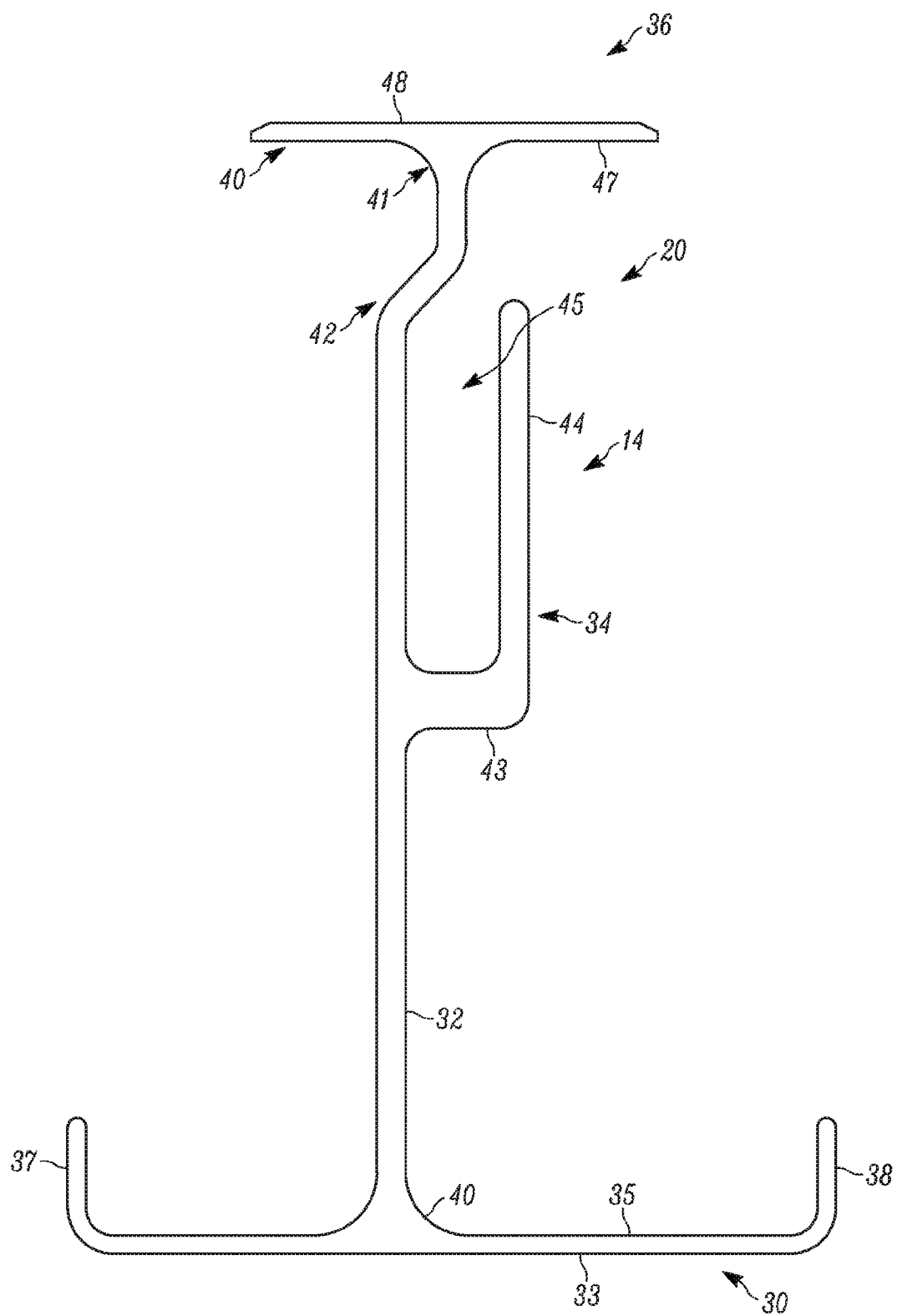
FIG. 4 of the drawings is a cross-sectional view of the central support bracket of the present disclosure.
Figure 5:
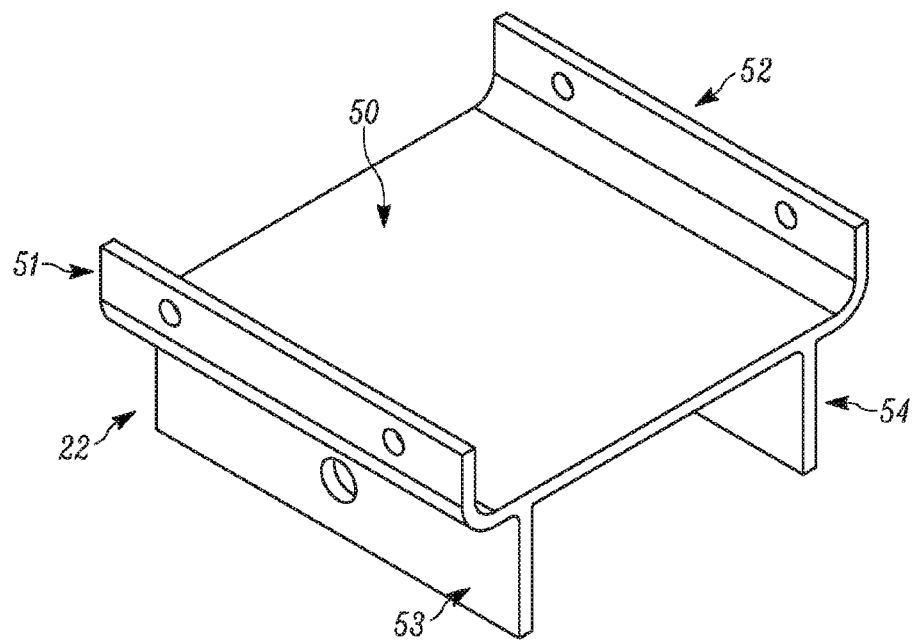
FIG. 5 of the drawings is a perspective view of the base splice bracket of the present disclosure.
Figure 6:
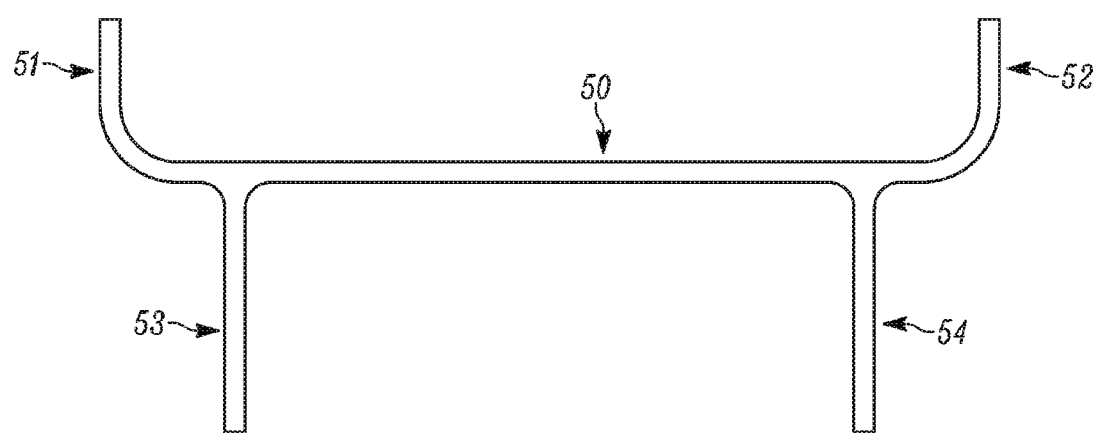
FIG. 6 of the drawings is a cross-sectional view of the base splice bracket of the present disclosure.
Figure 10:
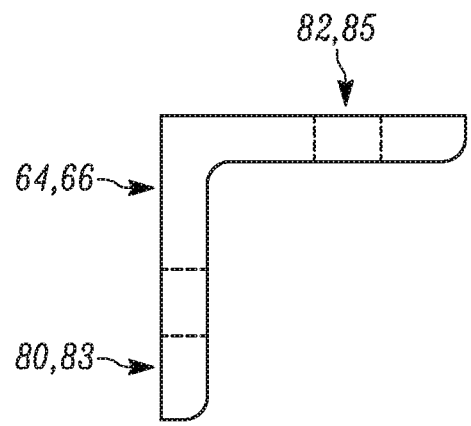
FIGS. 10 through 11b of the drawings are a number of views of the first and second support clip of the end edge bracket system of the present disclosure.
Figure 11A:
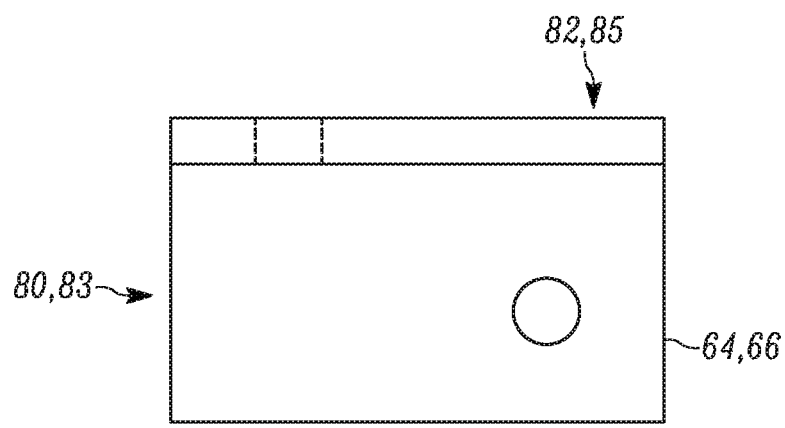
Figure 11B:
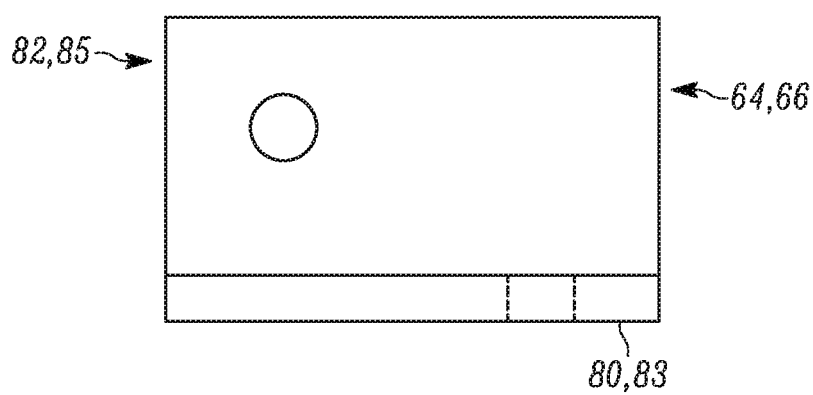
Figure 12:
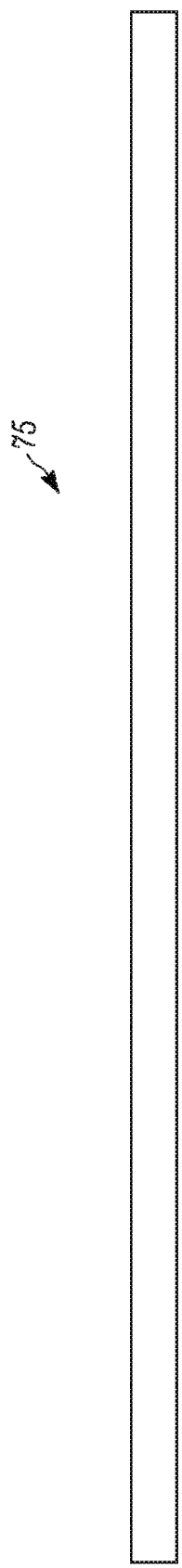
FIG. 12 of the drawings is a side elevational view of the gutter of the present disclosure.
Figure 13:
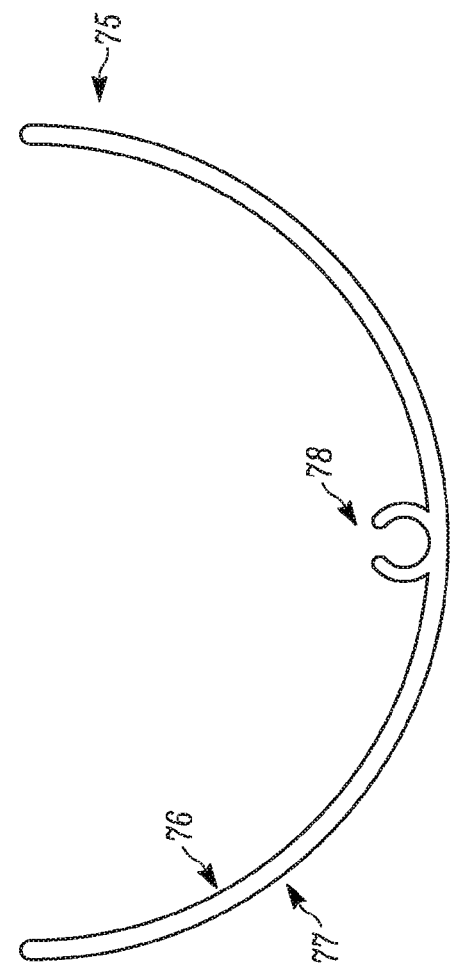
FIG. 13 of the drawings is a side elevational view of the gutter of the present disclosure.

Referring now to the drawings and in particular to FIGS. 1 through 3, the roof panel system is shown generally at 10. The roof panel system is typically coupled to rafters, such as rafter 100 to form the outer surface of a roof structure. In the configuration shown, the system is coupled directly to the rafters. In other systems it will be understood that the system can be coupled to an existing roof structure. The construction is not limited to any particular rafters or to any particular rafter structures or to a roof structure of a particular pitch or slope.

The roof panel system 10 is shown as including a plurality of roof panels, such as roof panel 12 which are positioned in a side by side orientation across the roof panel structure, a plurality of side edge bracket systems, such as side edge bracket system 14 and a plurality of end edge bracket systems, such as end edge bracket system 16. Each roof panel may comprise any number of different structures, including but not limited to solar panels, insulative panels, metal panels, wood panels, synthetic panels and the like. The disclosure is not limited to any particular type of material or structure. Certain systems may include any number of the foregoing roof panels, or others. Typically, the panels comprise rectangular panels that include top 90, bottom 91, opposing sides 92, 93 and opposing ends 94, 95. While a rectangular panel is shown, a number of different shapes are contemplated.

The side edge bracket system 14 is shown in FIGS. 4, 5, 6, 8 and 9 as comprising central support bracket 20, base splice bracket 22, first support clip 24 and second support clip 26. The central support bracket preferably comprises an extruded member having a substantially uniform cross-sectional configuration. It will be understood that the extruded member may include a plurality of surface variations, primarily through machining or the like. Of course, other forms of construction are likewise contemplated, and the system is not limited thereto.

The central support bracket 20 includes base trough 30, upstanding beam 32, depending flange 34 and upper flange 36. The base trough 30 includes outer base surface 33, upper surface 35, first lip 37 and second lip 38. The outer base surface 33 is typically mounted to an upper surface of the rafter 100. The upper surface includes opposing lips so as to provide rainwater collection and management. The upper surface is divided into two portions by the upstanding beam 32. The height of the first and second lips as well as the width of the upper surface 35 can be varied depending on the size of the rafter, the amount of water that is needed to me managed, the rate of supply of such water and other environmental considerations.

The upstanding beam includes proximal end 40, distal end 41 and bend region 42. The proximal end extends from upper surface 35 of the base trough. The distal end is generally spaced apart therefrom. The upstanding beam is generally orthogonal to the base trough, although variations are contemplated. The bend region 42 provides a width to the upstanding beam and positions the distal end at approximately the bisection of the base trough as the proximal end is slightly offset to one side of the trough.

The depending flange 34 extends from the upstanding beam between the proximal end and the bend region. The depending flange includes base wall 43 and upstanding wall 44 which define channel 45. The depending flange positions the upstanding wall 44 in a spaced apart orientation from the upstanding beam, with the bend region positioning the distal end of the upstanding beam between the upstanding beam proximate the flange and the upstanding wall 44.

The upper flange 36 includes first inside surface 46 extending from the distal end of the upstanding beam to one side and second inside surface 47 extending from the distal end of the upstanding beam to the other side, opposite of the first inside surface. Generally the inside surfaces are co-planar, although not required. The outer surface 48 is generally uniform across the distal end of the upstanding beam and is substantially planar or crowned, depending on the application.

The base splice bracket 22 includes base 50, first upper wall 51, second upper wall 52, first lower flange 53 and second lower flange 54. The base 50, the first upper wall 51 and the second upper wall 52 are configured to shape matingly engage the outer base surfaced 33 of the central support bracket. Thus, when two brackets are joined together end to end, the base splice bracket can be used to make the joint. A gasket can be provided between the base splice bracket and the central support bracket to insure water tightness.

The first and second lower flanges cooperate with the base 50 to define a structure for straddling the rafter 100. It will be understood that a number of different base splice brackets may be provided depending on the configuration of the rafter. In other embodiments spacers and the like may be provided to the base splice bracket wherein the rafter is thinner than the configuration defined by the base and the first and second lower flanges. The base splice bracket may be coupled to the central support bracket and to the rafter through a plurality of different fasteners, including, but not limited to threaded fasteners and rivets. Other structures, such as adhesive and the like are also contemplated.

The first support clip 24 is shown as comprising side wall 56 and upper support surface 57. The second support clip 26 is shown as comprising side wall 58 and upper support surface 59. The first support clip, as is shown, is positioned so that the side wall 56 abuts the upstanding beam 32 in a position wherein the upper support surface 57 (in cooperation with the upper flange of the central support bracket) sandwiches a roof panel therebetween. The second support clip, as is shown, is positioned so that the side wall 58 abuts the upstanding wall of the depending flange 34 in a position wherein the upper support surface 59 (in cooperation with the upper flange of the central support bracket) sandwiches a roof panel therebetween, on the opposite side of the upstanding beam from the roof panel held by the first support clip. It will be understood that a plurality of support clips are provided along the length of the central support bracket, with each one having a predetermined width, of, for example, 2 to 3 cm. Of course, brackets of different configurations, or lengths are contemplated. The first and second support clips are fastened to the respective central support brackets through, for example, fasteners such as threaded fasteners or rivets or the like. In certain configurations, the surfaces of the upstanding beam and the side walls of the support clips may include mating surface configurations which provide an additional measure of bonding that, when the fasteners couple the structures together, slidable movement is further precluded.

It will be understood that the central support brackets are spaced apart from each other a distance that corresponds to the distance between the side edges 92, 93 of the roof panel. The central support brackets are essentially coupled to the side edges of the different roof panels.

The end edge bracket system 16 is shown in FIGS. 7, 10, 11a and 11b, as well as in FIGS. 12 through 16, as comprising reinforcing lateral bracket 60, lower gutter bracket 62, gutter 75, first support clip 64 and second support clip 66. The end edge bracket system extends along the end edges 94, 95 of the roof panels and between adjacent central support brackets. The reinforcing lateral bracket 60 comprises an extruded member, preferably, that includes upper end 70, lower end 71, first side 72 and second side 73. In other embodiments, a flat stock member is likewise contemplated for use. The lower gutter bracket 62 includes gutter attachment member 74. The lower gutter bracket is attached to the reinforcing central bracket 60 so that the gutter attachment member 74 extends downwardly therefrom. Gutter 75 is positioned at the lower end of the lower gutter bracket 623 and includes mating member 78 on the upper surface 76 thereof. The gutter extends on either side of the reinforcing lateral bracket and includes upper so that any water extending through the system is collected thereby. The gutter extends upwardly while remaining below the roof panel along which the same extends.

The first support clip 64 includes side wall 80 and upper support surface 82. The second support clip 66 includes side wall 83 and upper support surface 85. As with the clips of the side edge bracket system, the support clips of the end edge bracket system is configured so that the side wall of each of the clips interfaces with one of the sides of the reinforcing lateral bracket and is generally fastened thereto.

The upper support surfaces 82, 85 are interfaced with the lower surface of a roof panel and provide support for the roof panel therealong from below. It will be understood that in certain configurations a plurality of first and second support clips may be utilized on either side of the reinforcing lateral bracket. In some configurations, such a bracket may have varying widths. It will be understood that the support clips are substantially identical.

In some configurations the reinforcing lateral bracket and the lower gutter portion thereof are formed from a single extrusion, whereas in other embodiments, they may form separate structures.

As is shown in the Figures, any water that passes between roof panels is captured either in the base trough 30 of the central support bracket, or in the gutter 75 of the reinforcing lateral bracket of the end edge bracket system. The water that is collected by the gutter is directed along the gutter to the end thereof wherein the water spills over into the base trough. With an angled rafter, the water from the base trough is directed into a gutter or directly outside when the lower end of the roof is reached. Advantageously, as well, when the system experiences thermal expansion and contraction, the system is configured to allow and compensate for such expansion and contraction. For example, the roof panels and the like can slidably move relative to the side edge bracket system and relative to the end edge bracket system.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A central support bracket for use in association with a roof panel system, the central support bracket further comprising an elongated extrusion and including a cross-sectional configuration defining,
    a base trough having a base surface with a first lip at a first end thereof and a second lip at a second end thereof each of which extends upwardly therefrom, the base trough defining a passageway for water or other fluid that may pass through the roof panel system;
    an upstanding beam extending upwardly from the base surface, between the first lip and the second lip and having a proximal end at the base surface and a distal end spaced apart therefrom;
    an upper flange proximate the distal end of the upstanding beam and defining a first inside surface extending to one side of the upstanding beam and a second inside surface extending to an opposite side of the upstanding beam; and
    a depending flange extending on one side of the upstanding beam spaced apart from the proximal and the distal end thereof, the depending flange including a base wall extending outwardly from the upstanding wall, and an upstanding wall extending upwardly from an end of the base wall to, in turn, define a channel with the upstanding beam
    wherein the upstanding beam includes a bend region between the proximal and distal end, with a portion between the bend region and the distal end is parallel to a portion between the proximal end and the bend region,
    wherein an axis through the portion of the upstanding beam between the bend region and the distal end bisects the base surface of the base trough between the first lip and the second lip, with an axis through the portion of the upstanding beam between the proximal end and the bend region being closer to one of the first lip and the second lip, and
    wherein the axis through the portion of the upstanding beam between the bend region and the distal end intersects the base wall of the depending flange between the portion of the upstanding beam between the bend region and the proximal end and the upstanding wall.

2. The central support bracket of claim 1 wherein an axis through the portion of the upstanding wall between the bend region and the distal end bisects the upper flange.

3. A roof panel system comprising:
    a side edge bracket system having a plurality of central support brackets, configured to be positionable along corresponding rafters, each comprising an elongated extrusion and including a cross-sectional configuration defining,
        a base trough having a base surface with a first lip at a first end thereof and a second lip at a second end thereof each of which extends upwardly therefrom, the base trough defining a passageway for water or other fluid that may pass through the roof panel system;
        an upstanding beam extending upwardly from the base surface, between the first lip and the second lip and having a proximal end at the base surface and a distal end spaced apart therefrom;
        an upper flange proximate the distal end of the upstanding beam and defining a first inside surface extending to one side of the upstanding beam and a second inside surface extending to an opposite side of the upstanding beam; and
        a depending flange extending on one side of the upstanding beam spaced apart from the proximal and the distal end thereof, the depending flange including a base wall extending outwardly from the upstanding beam, and an upstanding wall extending upwardly from an end of the base wall to, in turn, define a channel with the upstanding beam;
    an end edge bracket system having a plurality of reinforcing lateral brackets spanning between adjoining central support brackets; and
    a plurality of roof panels, each of the plurality of roof panels spanning between adjacent ones of the central support brackets with a reinforcing lateral bracket spanning between adjacent ones of the roof panels,
    wherein the upstanding beam includes a bend region between the proximal and distal end, with a portion between the bend region and the distal end is parallel to a portion between the proximal end and the bend region
    wherein an axis through the portion of the upstanding beam between the bend region and the distal end bisects the base surface of the base trough between the first lip and the second lip, with an axis through the portion of the upstanding beam between the proximal end and the bend region being closer to one of the first lip and the second lip; and
    wherein the axis through the portion of the upstanding beam between the bend region and the distal end intersects the base wall of the depending flange between the portion of the upstanding beam between the bend region and the proximal end and the upstanding wall.

4. The roof panel system of claim 3 wherein an axis through the portion of the upstanding wall between the bend region and the distal end bisects the upper flange.

5. A roof panel system comprising:
a side edge bracket system having a plurality of central support brackets, configured to be positionable along corresponding rafters, each comprising an elongated extrusion and including a cross-sectional configuration defining,
- a base trough having a base surface with a first lip at a first end thereof and a second lip at a second end thereof each of which extends upwardly therefrom, the base trough defining a passageway for water or other fluid that may pass through the roof panel system;
- an upstanding beam extending upwardly from the base surface, between the first lip and the second lip and having a proximal end at the base surface and a distal end spaced apart therefrom;
- an upper flange proximate the distal end of the upstanding beam and defining a first inside surface extending to one side of the upstanding beam and a second inside surface extending to an opposite side of the upstanding beam; and
- a depending flange extending on one side of the upstanding beam spaced apart from the proximal and the distal end thereof, the depending flange including a base wall extending outwardly from the upstanding beam, and an upstanding wall extending upwardly from an end of the base wall to, in turn, define a channel with the upstanding beam;

an end edge bracket system having a plurality of reinforcing lateral brackets spanning between adjoining central support brackets; and a plurality of roof panels, each of the plurality of roof panels spanning between adjacent ones of the central support brackets with a reinforcing lateral bracket spanning between adjacent ones of the roof panels, wherein, the side edge bracket system further includes a first support clip coupled to one of the upstanding beam and the upstanding wall of the depending flange of at least one of the plurality of central support brackets, wherein the first support clip, together with the upper flange sandwiches one of the plurality of roof panels therebetween, wherein, the first support clip is coupled to the upstanding wall of the depending flange of the at least one of the plurality of central support brackets, the side edge bracket system further including a second support clip coupled to the upstanding beam of the at least one of the plurality of central support brackets, with the first support clip cooperating with the upper flange to sandwich one of the plurality of roof panels therebetween, on a first side of the upstanding wall, with the second support clip cooperating with the upper flange to sandwich another one of the plurality of roof panels therebetween; and wherein, a single fastener extends through each of the first and second support clips, the upstanding beam and the upstanding wall of the depending flange.

6. The roof panel system of claim 5 wherein the side edge bracket system further includes a base splice bracket including a pair of lower flanges structurally configured to straddle a rafter, and to be coupled thereto, and a base having a first upper wall and a second upper wall, the base, first upper wall and second upper wall, shape matingly engageable with an outside surface of the base surface, the first lip and the second lip of the base trough and attachable thereto, so as to define a splice between a pair of the plurality of central support brackets that are coupled in an end to end fashion.

7. The roof panel system of claim 5 wherein at least one of the plurality of reinforcing lateral brackets is coupled to one of the plurality of roof panels.

8. The roof panel system of claim 7 wherein at least one of the plurality of reinforcing brackets further includes a gutter depending therefrom, the gutter extending between adjacent ones of the plurality of central support brackets, so that each end of the gutter overlies a portion of the base trough of the adjacent ones of the plurality of central support brackets.

9. The roof panel system of claim 8 wherein the gutter further includes a mating member in the form of a longitudinal channel extending therealong between each end thereof, with a plurality of lower gutter brackets, each gutter bracket having a gutter attachment member at a distal end thereof, wherein each gutter bracket is coupled at a first end to the reinforcing lateral bracket with the gutter attachment member being slidably mated to the mating member of the gutter to couple the gutter to the reinforcing lateral bracket.

* * * * *